Jan. 30, 1962     W. W. MARION, SR     3,019,415
AUTOMOBILE TRAFFIC SIGNAL

Original Filed July 21, 1958     3 Sheets-Sheet 1

INVENTOR:
WILLIAM W. MARION, Sr.

By John H. Bruninga
ATTORNEY,

Jan. 30, 1962 W. W. MARION, SR 3,019,415
AUTOMOBILE TRAFFIC SIGNAL
Original Filed July 21, 1958 3 Sheets-Sheet 2
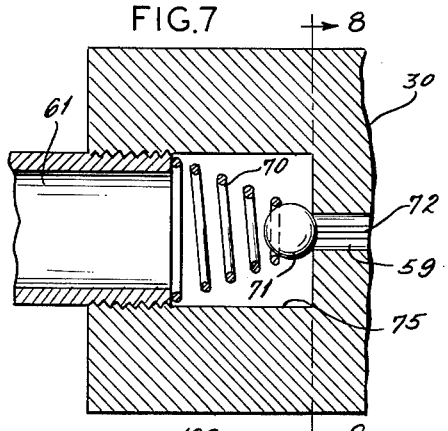
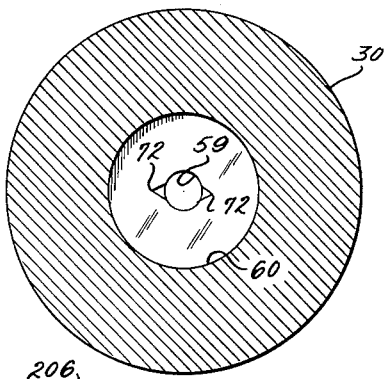
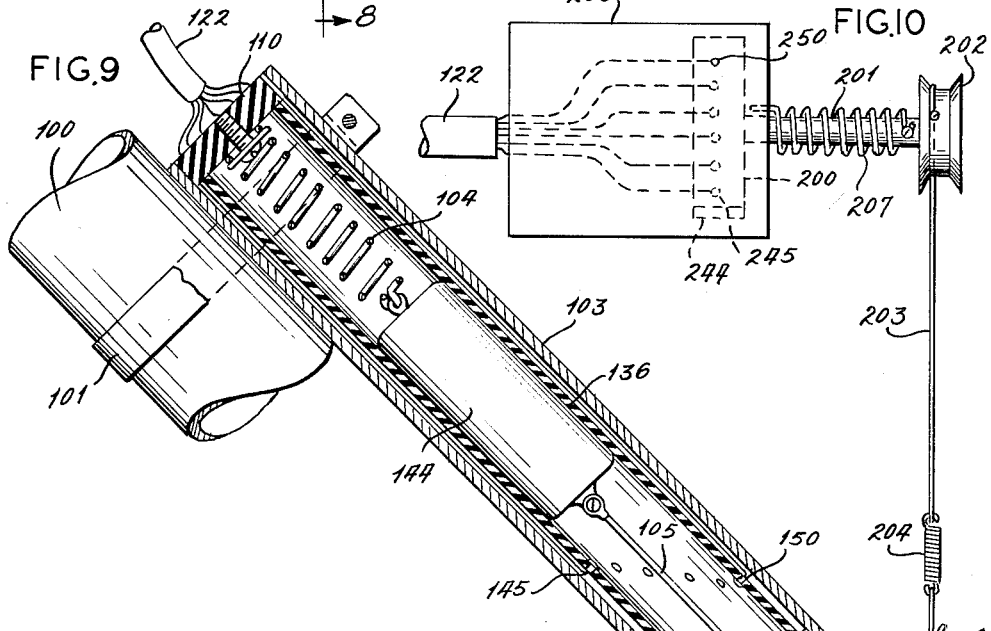
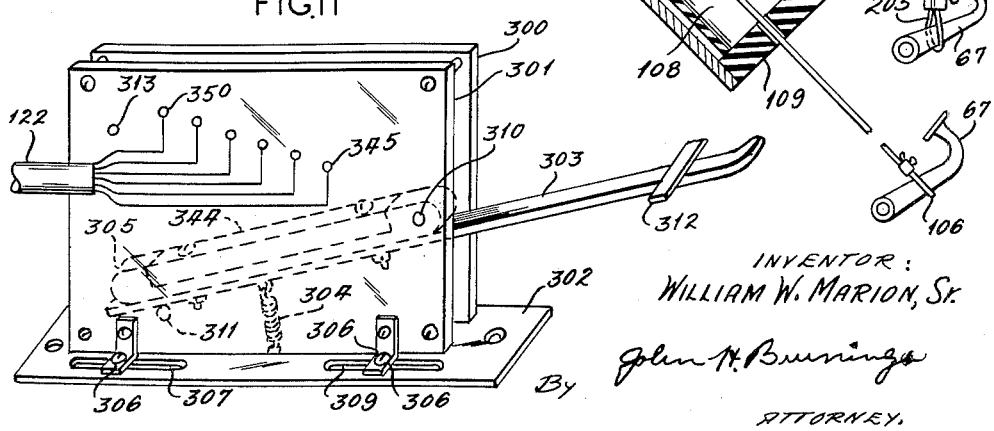
INVENTOR:
WILLIAM W. MARION, Sr.
By John H. Bruninga
ATTORNEY.

Jan. 30, 1962  W. W. MARION, SR  3,019,415
AUTOMOBILE TRAFFIC SIGNAL
Original Filed July 21, 1958
3 Sheets-Sheet 3

INVENTOR.
WILLIAM W. MARION, Sr.
BY
John H. Bruninga
ATTORNEY

United States Patent Office 3,019,415
Patented Jan. 30, 1962

3,019,415
AUTOMOBILE TRAFFIC SIGNAL
William W. Marion, Sr., 2372 Collett Drive,
St. Louis, Mo.
Continuation of application Ser. No. 749,914, July 21, 1958. This application Feb. 24, 1959, Ser. No. 795,283
5 Claims. (Cl. 340—82)

This invention relates to automobile traffic signals. It is particularly designed to notify the motorist behind, not only whether the motorist ahead is going to come to a stop, but just how fast he is going to come to a stop. That is, the rapidity with which the automobile ahead slows down is, of course, determined by the rapidity with which the brake is applied. This application is a continuation as to common subject-matter of application Serial No. 749,914, filed July 21, 1958, now abandoned.

One of the objects of this invention therefore is to provide an automobile traffic signal which is so constructed that the motorist behind is notified, not only that the automobile ahead is being braked to a stop, but the rapidity with which that is determined upon by the motorist ahead.

Further objects will appear from the detailed description, in which will be delineated illustrative embodiments of this invention; it is to be understood, however, that this invention is susceptible of various embodiments within the scope of the appended claims.

Generally stated and in accordance with the illustrative embodiments of this invention, the signal comprises an extended sign having a series of lighting units therealong and an actuator shiftable by the driver and connected to close the circuit of the units adapted to flash the units successively along the sign. The successive flashing along the sign may be either from the ends to the middle of the sign, from the middle to the ends of the sign, or even to from one end of the sign towards the middle or other end.

Figures 4, 5, 6:
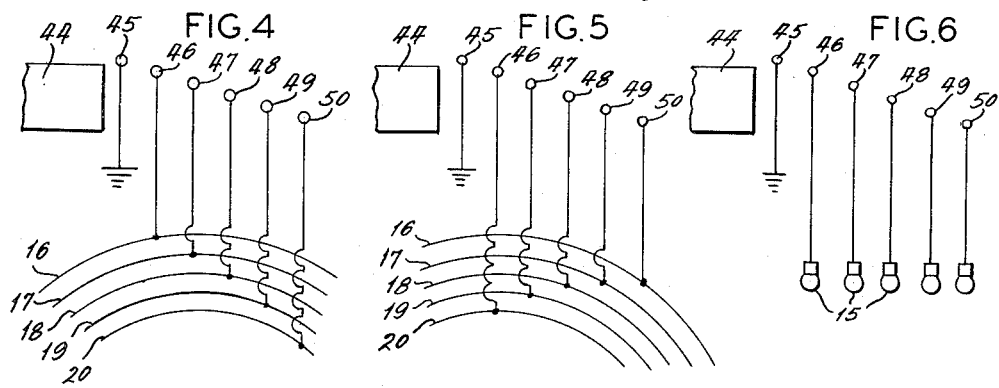
Figures 12, 13, 14, 15:
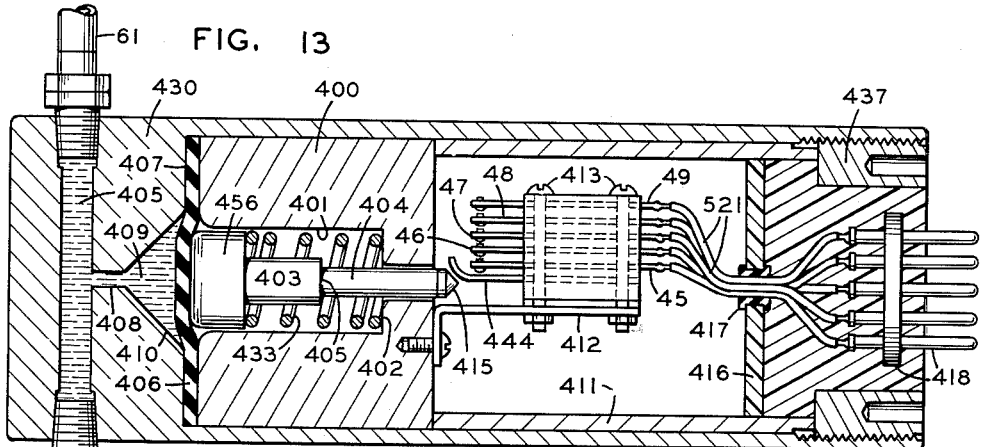

FIGS. 4, 5, and 6 are diagrams showing the connections of the switch to the lighting units in accordance with various embodiments of this invention;

FIG. 7 is a detailed section showing means for throttling the application of fluid pressure to the fluid pressure operated valve;

FIG. 8 is a section on the line 8—8, FIG. 7;

FIGS. 9, 10, and 11 are views somewhat diagrammatrical of three other embodiments of this invention; and FIGS. 12 and 13 and 14 and 15 are views, somewhat diagrammatical of two other embodiments of this invention; of these views, FIG. 12 is an end view, and FIG. 13 is a section along the line 13—13, FIG. 12; FIG. 14 is a section along the line 14—14, FIG. 15 and FIG. 15 is a section along the line 15—15, FIG. 14.

Figure 1:
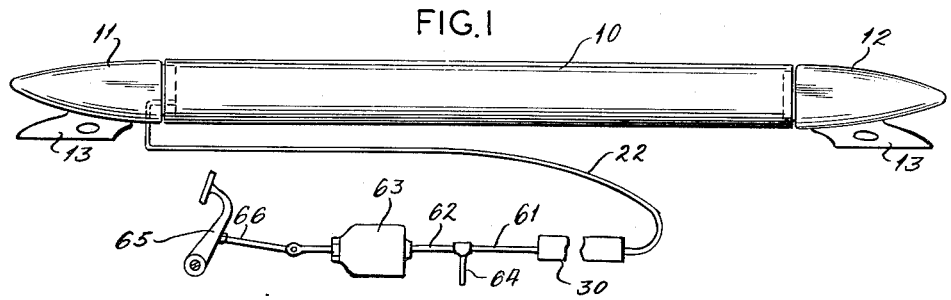
FIG. 1 is a rear view of a traffic signal as it appears on the rear of an automobile.

Referring to FIG. 1, 10 designates a transparent tube, which may be of glass or plastic and supported by ornamental ends 11 and 12, each having a bracket 13 for attachment to the rear of an automobile. Inside of the tube is a metal plate 14, FIG. 2, having a series of lighting units 15, such as lamp bulbs, whose outer shells are grounded on the metal plate 14. As shown in FIGS. 4, 5 and 6, the automobile battery B, one of its terminals is connected to a switch contact 45 as hereafter described, while the other terminal of the battery and the plate 14 are grounded at G on the automobile frame. The other terminals of the lamps are connected in pairs by conductors shown diagrammatically at 16, 17, 18, 19 and 20; it is, however, understood that these parallel connections extend along but are insulated from the grounded metal plate 14. Connected to each pair 16, 17, 18, 19 and 20 are conductors 21 in a cable 22, which lead to a switch, which will now be described.

Figure 2:
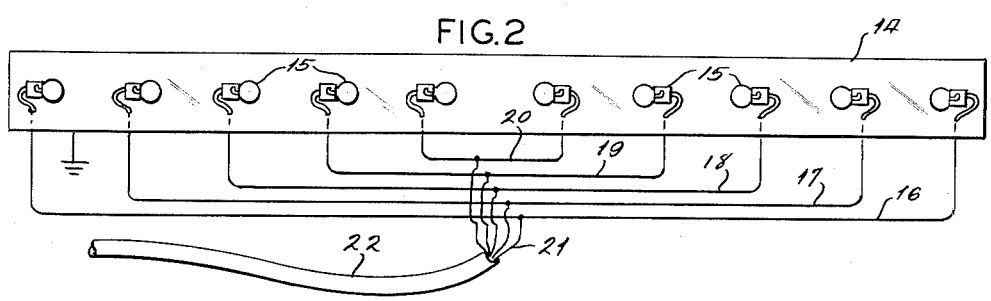
FIG. 2 is a detail showing the lighting units.
Figure 3:
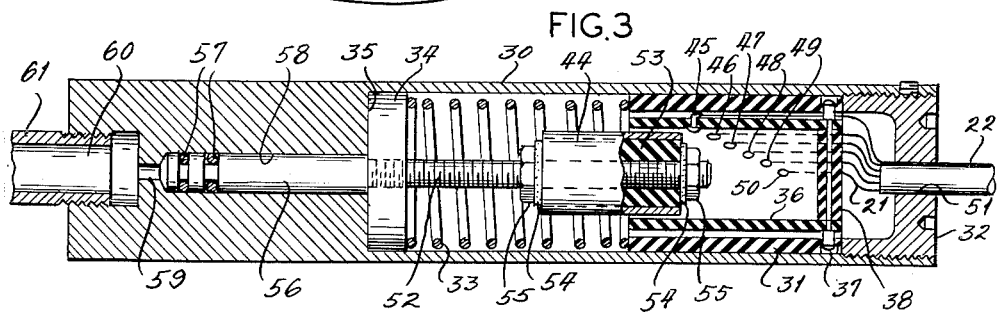
FIG. 3 is a cross-section of the switch and its actuator.

Referring to FIG. 3, 30 designates a casing, which may be of metal having fixed therein a sleeve 31 of insulating material, whose right end bears against a plug 32 screwed into the end of the casing. The other end of the sleeve 31 has bearing thereagainst a spring 33, in turn bearing against a collar 34, in turn bearing against a shoulder 35 in the casing. Arranged inside of the sleeve 31 is a sleeve 36, also of insulating material, which is fixed against endwise movement in the sleeve 31 by a cross-pin 37 passing through a perforated plug 38, also of insulating material. Arranged axially and spirally along the sleeve 36 are a series of terminals in the form of contacts 45, 46, 47, 48, 49 and 50. These contacts are connected to wires in the cable 22 passing through a perforation 51 in the plug 32. As shown in FIGS. 4, 5 and 6, the contact 45 and its connecting wire, which we may call the live wire, is connected to one terminal of the automobile battery, while the other terminal of the battery is as usual grounded as is also the plate 14, FIG. 2. The wires from the contacts 46, 47, 48, 49 and 50 are connected to the paralleling conductors 16, 17, 18, 19 and 20 respectively. Arranged on a threaded shaft 52 is an insulating sleeve 53, which is held thereon by washers 54, also of insulating material and nuts 55. The shaft 52 is connected to a piston 56, larger than the bore in the collar 34, and having packing rings 57, sliding in a bore 58 forming a cylinder. The insulating sleeve 53 has fixed thereon a metal sleeve 44 forming a movable contact, which is arranged to successively engage and bridge the contacts 45, 46, 47, 48, 49 and 50.

The inlet 59 to the cylinder bore 58 has a connection 60, which is connected by a pipe 61 leading from the fluid line 62 to the master cylinder 63, the fluid line 64, leading to the brakes. The master cylinder is controlled by the brake pedal 65 connected by a link 66 to the master cylinder.

FIG. 4 is a diagram showing the connections of the embodiment so far described, the contact 45 is as previously described, the line contact connected by its wire to one terminal of the automobile battery, while the contacts 46, 47, 48, 49 and 50 are connected to the paralleling connections 16, 17, 18, 19 and 20, respectively, in circuit with the central terminals of the lamps 15, whose shells are grounded on the plate 14, see FIG. 2.

The operation of the structure so far described is as follows: As the brake pedal is depressed, to apply the brakes, fluid will be applied to the piston 56 to move it to the right, FIG. 3, causing the metal sleeve 44 to successively contact with the contacts 45, 46, 47, 48, 49 and 50. Such operation causes the live contact 45 from one terminal of the battery to successively close the circuits to the contacts 46—50 leading to the connections in the order 16—20 and to the lamps 15 to cause the latter to successively flash from the ends to the middle in order to notify the following automobile that the automobile in front is being braked. The speed of operation of the brake is indicated by the speed of flashing from the ends to the middle of the signal.

FIG. 5 shows a diagram in which the flashing of the lamps 15 is successively from the middle of the signal to the outer ends thereof, as will be clear from the connections shown in that figure. In other words, movement of the sleeve 44 will again successively engage contacts 45, 46, 47, 48, 49 and 50, but in this case will successively close the circuits to 20, 19, 18, 17 and 16. Again, the rapidity of the application of the brake will be reported by the rapidity of the flashing of the lamps, in this case from the middle towards the ends of the signal.

FIG. 6 is a diagram in which the contacts 46, 47, 48, 49 and 50 are connected to the ungrounded terminals of the grounded lamps 15. Accordingly, as the sleeve 64 moves to the right, the lamps will be flashed from left to right. That may be employed to show a right turn and alternately as a stop, and again the rapidity of the application of the brake will be indicated by the rapidity of the flashing from left to right.

In all of the embodiments, FIGS. 4, 5 and 6, while the lamps are successively flashed, they remain on to the end of the movement of the brake pedal and to the end of movement of the metal sleeve 44.

FIGS. 7 and 8 show an embodiment adapted particularly for high pressure systems. In this embodiment, the chamber 75 to the connection 60 is lengthened to receive a spring 70, which bears against a ball 71 bearing against the inlet or throat 59. This throat, however, has extensions 72 which are not fully closed by the ball, so that the fluid pressure is throttled.

In all of the construction, after the brake pedal is released, the parts will return to normal position by the spring 33 bearing against 34 to move the piston 56 to the left, FIG. 3, carrying the metal sleeve with it.

In accordance with the illustrative embodiments of this invention, and referring to FIGS. 1–5, the automotive traffic signal comprises an extended sign in the form of a plate 14 which is grounded at G, FIG. 2. A series of lighting units 15 are arranged along the sign with the units arranged in pairs, with the units of each pair located on opposite ends of the sign, viz, arranged in pairs from the ends to the middle or vica versa. One terminal of each unit is connected to a source of current B, as by being grounded at G through the plate 14, FIGS. 2, 4 and 5. A plurality of contacts, specifically secondary contacts 46—50, are each connected by parallel leads 16—20 to the other terminals of pairs of units on the opposite ends of the sign, FIGS. 2, 4 and 5, those other terminals being insulated from the plate 14. A circuit-closing switch 44 is connected to the other terminal of the source B, as when the switch engages the contact 45, FIGS. 3, 4 and 5, which is specifically a primary contact. The switch 44 is positioned to successively engage the contacts 46—50 as it moves therealong to successively connect to the source B the other terminals of pairs of units on opposite ends of the sign. The switch is extended to successively bridge the contacts 46—50 as it moves therealong to maintain the connections to the source B of pairs of units on opposite ends of the sign. Specifically the primary contact 45 connected to the source B is arranged adjacently the secondary contacts 46—50; accordingly as the switch moves along the contacts 45—50 it also bridges the contact 45 and maintains the connection to the source B of pairs of contacts on opposite ends of the sign.

The circuit closing switch 44 is moved by an actuator such as a brake pedal 65. The above construction results in a continuous flash of the units along the sign, either from the middle of the sign to the ends, as will be seen from FIG. 5, or from the ends to the middle of the sign, as will be seen from FIG. 4. The rapidity of the flash will be in accordance with the rapidity with which the brake is applied, so that a driver of an automobile will be so informed by the driver ahead. The continuous flash, from the middle to the ends of the sign, or the reverse, is distinctive as a warning signal.

Generally stated the switch 44 operates to rapidly produce continuous pairs of flashes by pairs of units 15 in opposite directions along the sign. In FIG. 4 the primary contact 45 is arranged adjacently the first 46 of the secondary contacts which are connected to the pairs of units extending inwardly from the ends to the middle of the sign; accordingly the flash will be by pairs of units from the ends to the middle of the sign. In FIG. 5 the primary contact 45 is arranged adjacently the first 46 of the secondary contacts which are connected to the pairs of units extending outwardly from the middle to the ends of the sign; accordingly the flash will be by pairs of units from the middle to the ends of the sign.

FIGS. 9, 10 and 11 show all electrical systems embodying this invention. Generally, the contacts and the switch are indicated by the same reference numerals as in FIGS. 2 and 3 with prefixes 1, 2 and 3, respectively.

Referring to FIG. 9, the steering column 100 has attached thereto by a clamp 101 a casing 103. In this casing is a tube 136 of insulating material having contacts 145—150 as in FIGS. 1–3, and a metallic sleeve 144 insulated from the remaining parts of the device is arranged to successively engage those contacts. This sleeve is retained in an elevated position by a spring 104 connecting the sleeve with a disc 110 of insulating material, and an insulated cable 105 attached to the body of 144 has a loop 106 taking over the brake pedal 67. The operation of this embodiment is generally as in FIGS. 1–3; that is, as the driver steps on the brake pedal 67, the contact sleeve 144 successively engages the contacts 145—150. There is an extra space 108 allowing the sleeve 144 to move down to accommodate various brake pedals. The bottom of the casing 103 is closed by a sleeve 109 of insulating material; accordingly, the sleeve 144 is wholly insulated from the casing 103.

Referring to FIG. 10, 200 designates a rotary element mounted on a shaft 201 and having a sheave 202 connected by a cable 203 through a spring 204 by a loop 205 to the brake pedal 67. The rotary element is mounted in a casing 206, which is held in stationary position in any suitable means on the automobile and a spring 207 connects shaft 201 with 206 to normally move the connection 203 up. The inside of the casing 206 is of insulating material and has a series of contacts 245—250 as in FIGS. 1–3, and the element 210, which is of insulating material, has a metallic rim 244, which successively engages contacts 245—250. The operation of this embodiment is generally along the lines of FIGS. 1–3. The spring 204 permits the brake pedal to move to various positions.

Referring to FIG. 11, a pair of spaced plates 300 and 301 are mounted on a base 302 on the automobile. An arm 303 pivoted at 310 is normally held down against a stop 311 by a spring 304 and has an insulating part 305 on which is mounted a contact 344 adapted to successively engage contacts 345—350. The plates 300 and 301 are arranged to be adjusted along the base 302 by screws 306 engaging slots 307 in order to adjust the arm with respect to a part 312. The operation is again similar to the embodiment shown in FIGS. 1–2, for the arm 303 rests under a part 312 attached to the brake pedal or to an arm of the brake pedal. Accordingly, as the brake pedal is depressed, the left end of the arm 303 is elevated to cause the contact 344 to successively close the contacts 345—350. The upward movement of the left end of the arm 303 is arrested by a stop 313, but the right end of the arm 303 is flexible so that it can flex without damage should the brake pedal move down further as the arm 303 engages the stop 313.

Referring to FIGS. 12 and 13 parts similar to FIG. 3 are indicated by the same reference numerals with a prefix 4. The casing 430 has a collar 400 positioned in 430 and provided with a bore 401, in which is arranged a spring 433 bearing against a head 456, the end of the spring bearing against a shoulder 402. The head has a stem consisting of an enlarged part 403 and a reduced part 404, leaving a shoulder 405. A diaphragm 406 of rubber or plastic, such as neoprene, has its outer circumference clamped between the collar 400 and a shoulder 407 on the casing 430. A connection 61 from the master cylinder 63 (FIG. 2) is connected to one end of a bore 405 with the other end connected to the brake line 64. A bore 408 connects with the fluid inlet 409, which is enlarged as shown at 410 to apply pressure to the diaphragm 406.

Arranged in a tubular part 411 is a bracket 412 to which are clamped a series of contacts 45, 46, 47, 48 and 49 corresponding to the contacts 45, 46, 47, 48 and 49, FIGS. 3, 4, 5 and 6. These contacts are separated by insulating material (not shown) and are clamped together by screws 413. These contacts are of springy material, so that they are normally separated, but can be pressed successively together. Clamped with these contacts is also a strip 444, the end of which is rounded and engaged by a conical nose 415 of insulating material attached to the stem 404 of the head 456. The several contacts 45, 46, 47, 48 and 49 are connected with wires 521 which pass through a fiber washer 416 and a rubber grommet 417 and through an end plug 418 screwed into the end of the casing 430. A tube 411 is held between the collar 437 screwed into the casing 430 and the collar 400. The wires 521 are insulated from each other in the plug 418 and are connected, the wire from the contact 45, which is a live wire, being connected to one terminal of the battery (as in FIGS. 4, 5 and 6) while the wires from the contacts 46, 47, 48 and 49 are connected to the parallel connections 16, 17, 18 and 19 to the pairs of lamps 15 as shown in FIGS. 2, 4, 5 and 6.

The operation of this embodiment is substantially the same as the embodiment of FIG. 3 in connection with FIGS. 4, 5 and 6. The spring 433 will normally hold the actuator 456 to the left, FIG. 2, and the contacts 45, 46, 47, 48 and 49 will at that time be separated. Upon application of the brake, fluid is applied to the diaphragm 406 so as to cause it to move to the right and move the nose 415 of the actuator against 444 so as to successively engage the contacts 45, 46, 47, 48 and 49 in order to cause the lamps to flash as in FIGS. 4, 5 or 6. Upon release of the brake, the spring 433 will return the actuator and the contacts 45, 46, 47, 48 and 49 will again open.

Referring now to FIGS. 14 and 15, 500 designates a casing constructed as shown and provided with a Bourdon tube 501, connected with a bore 503 in a bracket 504 having a threaded part 505 with a bore which may be connected to the line 61 from the master cylinder, FIG. 1. The bottom end of the Bourdon tube 501 is clamped to the bracket 504 by a plate 550 and screws 551 and the Bourdon tube is open to the bore of the part 505, but is closed at its other end. Mounted on the bracket are a series of contacts 45, 46, 47, 48 and 49, which are similar constructions to those shown in FIG. 13 and clamped in relative insulated spaced relation by bolts 513. Mounted on the bracket is a spring arm 506, provided with a button 507 of insulating material. The arm 506 is connected by links 508 and 509 to the end of the Bourdon tube. As in FIG. 13, wires 521 are connected to the several contacts 45, 46, 47, 48 and 49, the contact 45 being the live contact connected to the one terminal of the battery, while the other contacts lead to the several connections 16, 17, 18 and 19 to the lamps 15, FIG. 2, and as in FIGS. 4, 5, and 6.

The operation of the embodiment of FIGS. 14 and 15 is similar of that of FIG. 13 in connection with FIGS. 2, 4, 5 and 6. Upon application of the brake, the fluid will operate through the Bourdon tube 501 to raise the arm 506 and cause the contacts 45, 46, 47, 48 and 49 to successively engage in order to successively flash the lamps.

It will therefore be seen that this invention accomplishes its objects. A simple and convenient automobile signal is provided by means of which the driver of an automobile in applying his brake, will notify the occupant of the automobile following that the automobile ahead is coming to a stop, either slowly or fast; if to a slow stop, then the flashing will be gradual, but if coming to a quick stop, then the flashing will be fast.

Having thus described the invention, what is claimed and desired to be secured by Letters Patent is:

1. An automotive traffic signal, comprising, an extended sign having a series of lighting units each having terminals and arranged therealong in pairs with the units of each pair located on opposite ends of said sign, a source of electric current one of whose terminals is connected to one of the terminals of each unit, a plurality of contacts each of which is connected by parallel leads to the other terminals of a pair of said units on opposite ends of said sign, said contacts being arranged adjacently in a series corresponding to and connected to the second terminals of pairs of said units on opposite ends of said sign, and a circuit-closing switch having a contact and connected to the second terminal of said source and movable to successively engage said first contacts to successively connect to the second terminal of said source the second terminals of pairs of units on opposite ends of said sign, said circuit-closing contact being extended to successively bridge said second contacts as it moves therealong to maintain the connections to said source of pairs of units on opposite ends of said sign, said switch operating to rapidly produce continuous pairs of flashes by pairs of said units in opposite directions along said sign.

2. An automotive traffic signal, comprising, an extended sign having a series of lighting units each having terminals and arranged therealong in pairs with the units of each pair located on opposite ends of said sign, a source of electric current one of whose terminals is connected to one of the terminals of each unit, a plurality of secondary contacts each of which is connected by parallel leads to the other terminals of a pair of said units on opposite ends of said sign, said secondary contacts being arranged adjacently in a series corresponding to and connected to the second terminals of pairs of said units on opposite ends of said sign, a primary contact arranged adjacently said secondary contacts and connected to the second terminal of said source, and a circuit-closing switch movable to successively engage said primary and secondary contacts as it moves therealong to successively connect to the second terminal of said source of the second terminals of pairs of units on opposite ends of said sign, said switch contact being extended to successively bridge said primary and secondary contacts as it moves therealong to maintain the connections to said source of pairs of units on opposite ends of said sign, said switch operating to rapidly produce continuous pairs of flashes by pairs of said units in opposite directions along said sign.

3. An automotive traffic signal, comprising, an extended sign having a series of lighting units each having terminals and arranged therealong in pairs with the units of each pair located on opposite ends of said sign, a source of electric current one of whose terminals is connected to one of the terminals of each unit, a plurality of secondary contacts each of which is connected by parallel leads to the other terminals of a pair of said units on opposite ends of said sign, said secondary contacts being arranged adjacently in a series corresponding to and connected to the second terminals of pairs of said units on opposite ends of said sign, a primary contact arranged adjacently the first of said secondary contacts which are connected to the pairs of units extending from the ends to the middle of the sign, said primary contact being connected to the second terminal of said source, and a circuit-closing switch having a contact and movable to successively engage said primary and secondary contacts as it moves therealong to successively connect to the second terminal of said source the second terminals of pairs of units on opposite ends of said sign, said switch contact being extended to successively bridge said primary and secondary contacts as it moves therealong to maintain the connections to said source of pairs of units on opposite ends of said sign, said switch operating to rapidly produce pairs of continuous flashes by pairs of said units in opposite directions from the ends to the middle of the sign.

4. An automotive traffic signal, comprising, an extended sign having a series of lighting units each having terminals and arranged therealong in pairs with the units of each pair located on opposite ends of said sign, a source of electric current one of whose terminals is connected to one of the terminals of each unit, a plurality of secondary contacts each of which is connected by parallel leads to the other terminals of a pair of said units on opposite ends of said sign, said secondary contacts being arranged adjacently in a series corresponding to and connected to the second terminals of pairs of said units on opposite sides of said sign, a primary contact arranged adjacently the first of said secondary contacts which are connected to the pairs of units extending from the middle to the ends of the sign, said primary contacts being connected to the second terminal of said source, and a circuit-closing switch having a contact and movable to successively engage said primary and secondary contacts as it moves therealong to successively connect to the second terminal of said source the second terminals of units on opposite ends of the sign, said switch contact being extended to successively bridge said primary and secondary contacts as it moves therealong to maintain the connections to said source of pairs of units on opposite ends of said sign, said switch operating to rapidly produce pairs of continuous flashes by pairs of said units in opposite directions from the middle to the ends of the sign.

5. An automotive traffic signal, comprising, an extended sign having a series of lighting units each having terminals and arranged therealong in pairs with the units of each pair located on opposite ends of said sign, a source of electric current one of whose terminals is connected to one of the terminals of each unit, a plurality of secondary contacts each of which is connected by parallel leads to the other terminal of a pair of said units on opposite ends of said sign, said secondary contacts being arranged adjacently in a series corresponding to and connected to the second terminal of pairs of said units on opposite ends of said sign, a circuit-closing switch having a contact connected to the second terminals of said source and movable to successively engage said first contacts to successively connect to the second terminal of said source the second terminals of pairs of units on opposite ends of said sign, said circuit-closing contact being extended to successively bridge said second contacts as it moves therealong to maintain the connections of said source of pairs of units on opposite ends of said sign, said switch operating to rapidly produce continuous pairs of flashes by pairs of said units in opposite directions along said sign, a fluid pressure operated actuator connected to move said circuit-closing switch, and means for throttling the application of the fluid pressure to said actuator.

References Cited in the file of this patent

UNITED STATES PATENTS

| | | |
|---|---|---|
| 1,623,219 | Tolmach | Apr. 5, 1927 |
| 1,625,565 | Rosenberg | Apr. 19, 1927 |
| 1,746,725 | Wolff | Feb. 11, 1930 |
| 1,946,759 | Preston | Feb. 13, 1934 |

FOREIGN PATENTS

| | | |
|---|---|---|
| 13,846 | Great Britain | of 1912 |
| 374,523 | Great Britain | June 16, 1932 |
| 644,373 | Great Britain | Oct. 2, 1950 |
| 184,835 | Austria | June 15, 1955 |